US008221225B2

(12) United States Patent
Laut

(10) Patent No.: US 8,221,225 B2
(45) Date of Patent: Jul. 17, 2012

(54) SYSTEM AND METHOD FOR PERSONAL WAGERING

(75) Inventor: Steven Laut, Norco, CA (US)

(73) Assignee: Steven Laut, Norco, CA (US)

( * ) Notice: Subject to any disclaimer, the term of this patent is extended or adjusted under 35 U.S.C. 154(b) by 737 days.

(21) Appl. No.: 11/581,842

(22) Filed: Oct. 17, 2006

(65) Prior Publication Data

US 2008/0039192 A1 Feb. 14, 2008

Related U.S. Application Data

(63) Continuation-in-part of application No. 11/494,179, filed on Jul. 26, 2006.

(51) Int. Cl.
*A63F 13/00* (2006.01)

(52) U.S. Cl. .......................................... 463/25; 463/42

(58) Field of Classification Search .................... 463/25, 463/26, 42; 705/26
See application file for complete search history.

(56) References Cited

U.S. PATENT DOCUMENTS

| | | | | | |
|---|---|---|---|---|---|
| 5,575,474 | A | | 11/1996 | Rossides | |
| 5,749,785 | A | | 5/1998 | Rossides | |
| 5,842,921 | A | * | 12/1998 | Mindes et al. | 463/16 |
| 6,443,841 | B1 | | 9/2002 | Rossides | |
| 2002/0046137 | A1 | * | 4/2002 | Odom et al. | 705/26 |
| 2002/0132663 | A1 | * | 9/2002 | Cumbers | 463/25 |
| 2003/0018564 | A1 | * | 1/2003 | Bonnier et al. | 705/37 |
| 2003/0130042 | A1 | * | 7/2003 | Ollins | 463/43 |
| 2003/0224854 | A1 | * | 12/2003 | Joao | 463/40 |
| 2004/0192435 | A1 | * | 9/2004 | Marshall et al. | 463/25 |
| 2006/0036511 | A1 | * | 2/2006 | Lin | 705/26 |
| 2006/0063587 | A1 | * | 3/2006 | Manzo | 463/25 |

OTHER PUBLICATIONS poserfish.com, POSERFISH.COM S.A.

* cited by examiner

*Primary Examiner* — Peter DungBa Vo
*Assistant Examiner* — Allen Chan
(74) *Attorney, Agent, or Firm* — Steven Laut, Esq.

(57) ABSTRACT

A method and a system to provide a medium for facilitating personal wagering for sporting or non-sporting events. Users wager against each other for events. Users can make their own odds and handicaps. Users can wager for property, goods, services, or items with non-monetary value. Alerts are automatically distributed to users informing them of available wager offers. Only users are responsible for completing the wager.

21 Claims, 7 Drawing Sheets

SYSTEM AND METHOD FOR PERSONAL WAGERING

This application is a continuation-in-part of U.S. application Ser. No. 11/494,179, filed on Jul. 26, 2006, titled "SYSTEM AND METHOD FOR PERSONAL WAGERING."

BACKGROUND OF THE INVENTION

1. Field of the Invention

Exemplary embodiments relate generally to the technical field of personal wagering and, in one exemplary embodiment, to methods and systems to facilitate personal wagers between users or groups of users and determining new wager events.

2. Description of the Related Art

Online gaming typically consists of online casinos, virtual casinos, horse racing and online sports books. These types of wagering include a house or casino that takes bets from individuals, i.e. Gambling Businesses. Therefore, the individuals are betting against the house or casino. The house or casino sets the odds, point spread, and the payout. Individuals fill an account or transfer funds to the Gambling Businesses and, if they lose wagers, the funds are transferred to the Gambling Business.

BRIEF DESCRIPTION OF THE DRAWINGS

Embodiments are illustrated by way of example and not by way of limitation in the figures of the accompanying drawings in which like references indicate similar elements. It should be noted that references to "an" embodiment in this disclosure are not necessarily to the same embodiment, and such a reference may mean at least one.

DETAILED DESCRIPTION

A method and system to facilitate personal wagering between users are described. In the following description, for purposes of explanation, numerous specific details are set forth in order to provide a thorough understanding of an exemplary embodiment of the present invention. It will be evident, however, to one skilled in the art that the present invention may be practiced without these specific details.

Exemplary Platform Architecture

Figure 1:
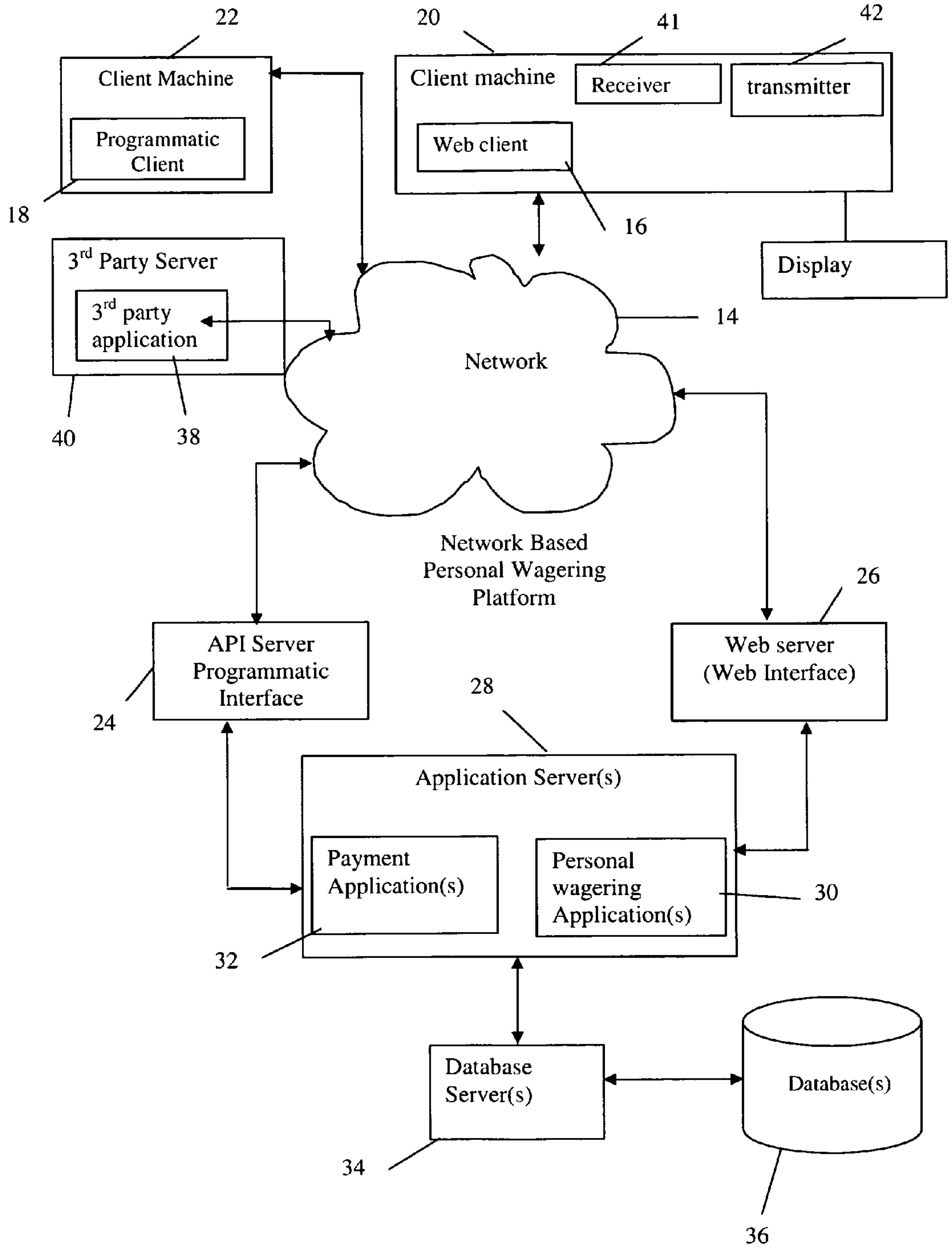
FIG. 1 is a block diagram of an exemplary web-based facility in the form of a network based personal wagering facility according to one embodiment of the present invention.

FIG. 1 is a network diagram depicting a system 10, according to one exemplary embodiment, having a client-server architecture. A personal wagering platform, in the exemplary form of a network based personal wagering facility 12, provides server-side functionality, via a network 14 (e.g., the Internet) to one or more client machines 20 and 22. FIG. 1 illustrates, for example, a web client 16 (e.g., a browser, such as the INTERNET EXPLORER browser developed by Microsoft Corporation of Redmond, Wash. State), and a programmatic client 18 executing on respective client machines 20 and 22.

Turning specifically to the network based wagering facility 12, an Application Program Interface (API) server 24 and a web server 26 are coupled to, and provide programmatic and web interfaces respectively to, one or more application servers 28. The application servers 28 host one or more personal wagering applications 30 and payment applications 32. The application servers 28 are, in turn, shown to be coupled to one or more database servers 34 that facilitate access to one or more databases 36.

The personal wagering applications 30 provide a number of personal wagering functions and services to users that access the personal wagering facility 12. The payment applications 32 likewise provide a number of payment services and functions to users. For example, users may purchase goods or services, gift certificates, etc. In one embodiment the payment applications 30 may allow users to quantify for, and accumulate, value (e.g., in a commercial currency, such as the U.S. dollar, or a proprietary currency, such as "points" or credits) in accounts, and then later to use the accumulated value for wagering that are made available via the personal wagering applications 30. While the personal wagering and payment applications 30 and 32 are shown in FIG. 1 to both form part of the network based personal wagering facility 12, it will be appreciated that, in alternative embodiments, the payment applications 32 may form part of a payment service that is separate and distinct from the personal wagering facility 12.

In still other embodiments, no payment applications exist as users are responsible for completing wagers (i.e., users that have lost a wager arrange payment with the winner personally and separately from the wagering facility. Therefore, in this embodiment, the wagering facility or website never: receives, transfers, takes a percentage, collects a service fee, collects a subscription fee, etc. directly relating to a wager. And, the wagering facility or website, therefore, does not have any risks related to wagers.

Further, while the exemplary system 10 shown in FIG. 1 employs a client-server architecture, the present invention is of course not limited to such an architecture, and could equally well find application in a distributed, or peer-to-peer, architecture system. The various personal wagering and payment applications 30 and 32 could also be implemented as standalone software programs, which do not necessarily have networking capabilities.

The web client 16, it will be appreciated, may access the various personal wagering and payment applications 30 and 32 via the web interface supported by the web server 26. Similarly, the programmatic client 18 may access the various services and functions provided by the personal wagering and payment applications 30 and 32 via the programmatic interface provided by the API server 24. The programmatic client 18 may, for example, be a betting application to enable wagerers to author and manage wager offers/acceptance on the personal wagering facility 12 in an off-line manner, and to perform batch-mode communications between the programmatic client 18 and the network based personal wagering facility 12.

FIG. 1 also illustrates a third party application 38, executing on a third party server machine 40, as having programmatic access to the network based personal wagering facility 12 via the programmatic interface provided by the API server 24. For example, the third party application 38 may, utilizing information retrieved from the network based personal wagering facility 12, support one or more features or functions on a website hosted by the third party. The third party website may, for example, provide one or more promotional, personal wagering or payment functions that are supported by the relevant applications of the network based personal wagering facility 12.

In one embodiment, client machine 20 also includes a receiver 41, transmitter 42 and a display 45. In one embodiment receiver 41 wirelessly receives data/information and transmitter 42 transmits data/information wirelessly. In one embodiment, client machine 20 is mobile, such as disposed in a vehicle, a notebook computer, a personal digital assistant (PDA), a cellular telephone, etc. Receiver 41 may be capable of receiving information/data/voice/video content, for example from network 14. Transmitter 42 may be capable of transmitting information/data/voice/video content to, for example network 14. The display 45 can be any type of display capable, for example, of displaying graphical/video/images/text. A user interface may also be coupled to client machine 20. The user interface may be a keyboard, resistive digitizer (e.g., touchscreen), mouse, microphone/speaker(s), etc. Transmitter 42 may transmit location information/data in a hypertext (HTTP) transmission.

Personal Wagering Applications

Figure 2:
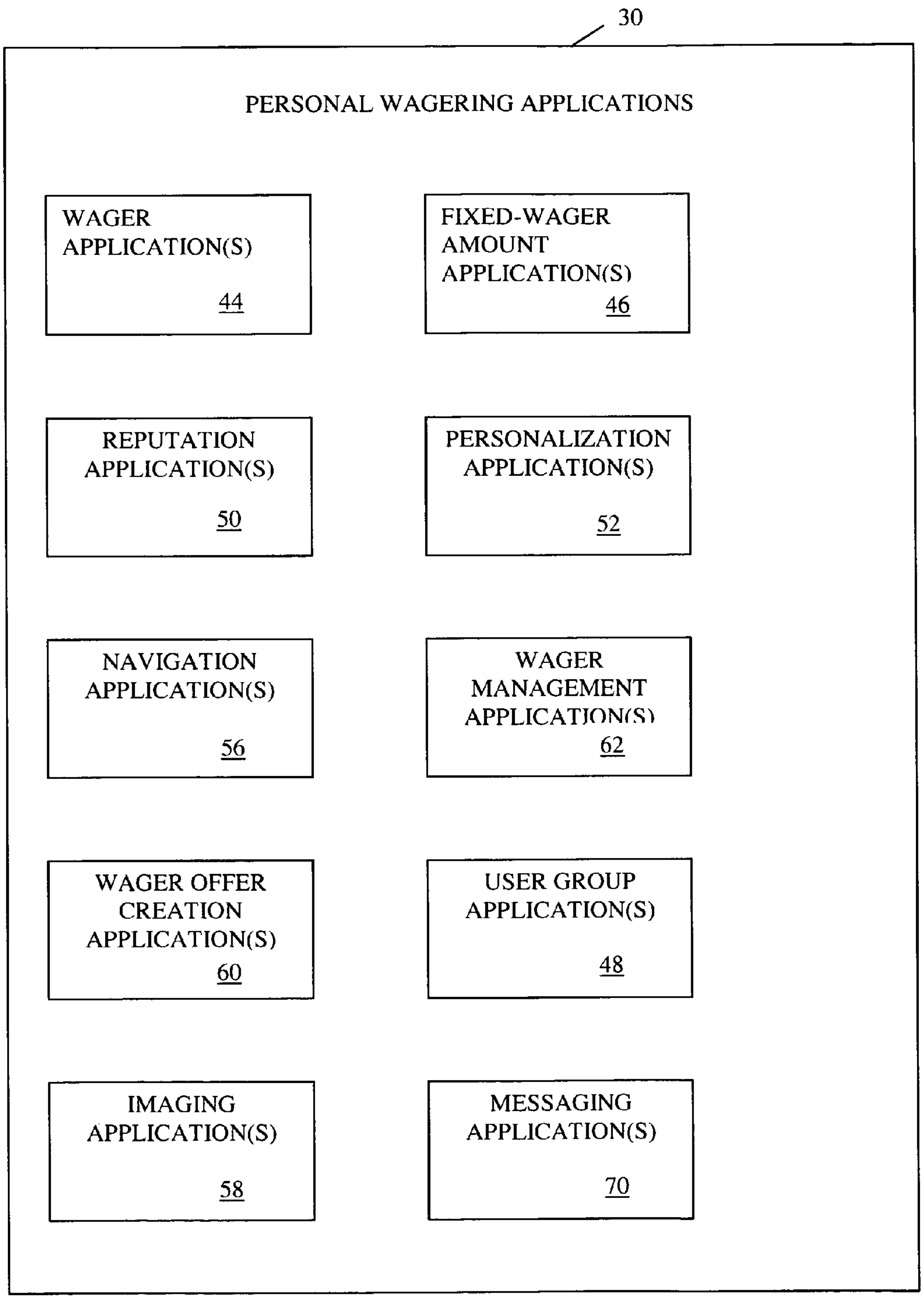
FIG. 2 is a database diagram illustrating an exemplary database, maintained by and accessed via a database engine server, that at least partially implements and supports a SPAM inhibiting tool in the personal wagering facility according to one embodiment of the present invention.

FIG. 2 is a block diagram illustrating multiple personal wagering and payment applications 30 that, in one exemplary embodiment of the present invention, are provided as part of the network based personal wagering facility 12. The network based personal wagering facility 12 may provide a number of personal wagering offers whereby a user may provide listings (e.g., list wager offers) a user can express interest in or indicate a desire to wager, and a wager amount or item can be set for a bet pertaining to the offered wager. To this end, the personal wagering applications 30 are shown to include one or more wager applications 44 which support wager-format listing and wager amount setting mechanisms. The various wager applications 44 may also provide a number of features in support of such wager-format listings, such as a minimum wager amount, maximum wager amount, maximum loss for a specified period (e.g., weekly, monthly, etc.) and maximum total wagers whereby a user may specify a wager amount in connection with a listing and a proxy-wagering feature whereby a user may invoke automated proxy wagering.

A number of fixed-wager amount applications 46 may support fixed-wager amount listing formats. For example, a user may have a set wager amount (e.g., $5.00, $10.00, $20.00, $100.00, etc.) to offer in conjunction with a specific type of event, such as a specific baseball team game, basketball team game, football team game, rugby, tennis match, jai lai, cricket, polo, wrestling, boxing, chess match, election, etc. In another embodiment, non-fixed (i.e., user specified) wager amounts can be specified by a user as desired.

User group applications 48 may allow specific users to group their listings within a "virtual" wagering facility, which may be personalized by and for the specific users. In this embodiment, users join a group by either being invited or requesting to join. The users in a group can then wager with one another. The groups may be public or non-public. A public group allows non-group users to see the wagering statistics of the individuals and group. A non-public group only allows group members to view individual members or group statistics. In another embodiment, a user decides whether their statistics can be seen by all other users or a selected number of users.

Reputation applications 50 may allow users that wager utilizing the network based personal wagering facility 12 to establish, build and maintain reputations, which may be made available and published to potential users. Consider that where, for example, the network based personal wagering facility 12 supports person-to-person wagering, users may have no history or other reference information whereby the trustworthiness and credibility of potential wagering partners may be assessed. The reputation applications 50 may allow a user, for example through feedback provided by other wager partners, to establish a reputation within the network based personal wager facility 12 over time. Other potential wagering partners may then reference such a reputation for the purposes of assessing credibility and trustworthiness. Personalization applications 52 may allow users of the network based personal wagering facility 12 to personalize various aspects of their interactions with the personal wagering facility 12. For example a user may, utilizing an appropriate personalization application 52, create a personalized reference page at which information regarding wagers to which the user is (or has been) a party may be viewed. Further, a personalization application 52 may enable a user to personalize wager offers and other aspects of their interactions with the personal wagering facility 12 and other parties.

In one embodiment, the network based personal wagering facility 12 may support a number of wager offers from users that are customized for specific geographic regions, or specific demographics. A version of the network based personal wagering facility 12 may be customized for the United Kingdom, whereas another version of the marketplace 12 may be customized for the United States. Each of these versions may operate as an independent personal wagering facility, or may be customized (or internationalized) presentations of a common underlying personal wagering facility.

Navigation of the network based personal wagering facility 12 may be facilitated by one or more navigation applications 56. For example, a search application may enable key word searches of wager offers published via the personal wagering facility 12. A browse application may allow users to browse various category, catalogue, or type of event data structures according to which wager offers may be classified within the personal wagering facility 12. Various other navigation applications may be provided to supplement the search and browsing applications.

In order to make wager offers, available via the network based personal wagering facility 12, as visually informing and attractive as possible, the personal wagering applications 30 may include one or more imaging applications 58 which users may utilize to upload images for inclusion within wager offers. An imaging application 58 may also operate to incorporate images within viewed wager offers. The imaging applications 58 may also support one or more promotional features, such as image galleries that are presented to potential wagerers.

Wager offer creation applications 60 may allow wager offerers conveniently to author listings pertaining to types of events that they wish to wager via the personal wagering facility 12, and wager management applications 62 may allow wager offerers to manage such wager offers. For example, where a particular wager offerer has authored and/or published a large number of wager offers, the management of such wager offers may present a challenge. The wager offer management applications 62 may provide a number of features (e.g., auto-relisting) to assist the wager offerer in managing such listings. One or more post-listing management applications 64 may also assist wager offerers with a number of activities that typically occur post-listing. For example, upon completion of a wager facilitated by one or more wager applications 44, a user may wish to leave feedback regarding a particular user. To this end, a post-listing management application 64 may provide an interface to one or more reputation applications 50, so as to allow the user conveniently to provide feedback regarding multiple users to the reputation applications 50.

Messaging applications 70 may be responsible for the generation and delivery of messages to users of the network based personal wagering facility 12, such messages (e.g., web posting, text messaging or email) for example advising users of wager offers for specific events (e.g., sporting events, or other non-sporting events, such as elections, awards, stock prices, stock market statistics, future actions by world leaders, outcomes of high profile court cases, etc.) that may be of interest to certain users. In one embodiment, users obtain an account and select specific teams, players, participants, etc. that they are interested in wagering on. For example, a user may be a fan of a college or professional athletic team, a boxer, NHRA®, NASCAR®, a person running for office, stock prices, stock market statistics, Oscars, Grammys, ESPYs, sport draft picks, etc. When a user selects to place a personal wager offer, all users that selected an opposing participant in the event is automatically alerted to the offer. In one embodiment, a user can select a specific location to limit wager offers to users located in the specific locations. The specific locations may be a city, a state, a country, a continent, etc.

In one embodiment, end dates are associated with wagering events. The post-listing management application 64 updates a database when a wagering event ends. Scores, decisions, results are entered into a database, either automatically through a service or application, or manually. The results are compared to the wager to decide a winner of a wager that has ended. The comparison involves reading points given/taken, handicaps, etc. Once a winner is determined, the messaging applications 70 alerts the parties of the wagers that ended who the winner is through email, a personal page, text messaging, etc. The wager parties can then complete their wager.

Data Structures

Figure 3:
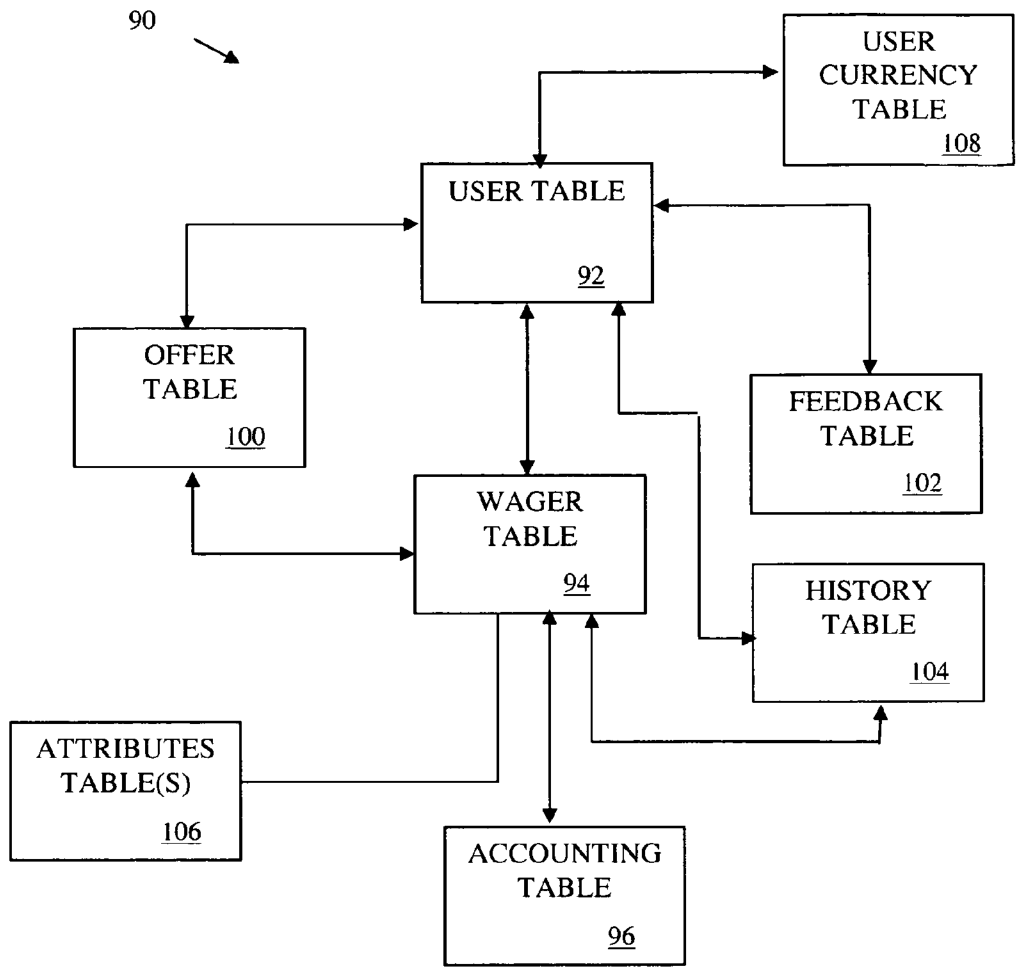
FIG. 3 provides exemplary detail of the user table shown in FIG. 2.

FIG. 3 is a high-level entity-relationship diagram, illustrating various tables 90 that may be maintained within the databases 36, and that are utilized by and support the personal wagering facility and payment applications 30 and 32. A user table 92 contains a record for each registered user of the network based personal wagering facility 12, and may include identifier, address and financial instrument information pertaining to each such registered user. A user may, it will be appreciated, operate as an offerer, an acceptor, or both, within the network based personal wagering facility 12.

The tables 90 also include, for example, a wager table 94 in which is maintained item records for wagers that are available to be, or have been, completed via the personal wagering facility 12. Each item record within the items table 94 may furthermore be linked to one or more user records within the user table 92, so as to associate an offerer and one or more actual or potential acceptors with each item record.

An accounting table 96 may have records for all wagers pertaining to users for which records exist within wager table 94. The accounting table tracks wins/losses continuously. In one embodiment, the high winners/losers are posted for a predetermined period (e.g., daily, weekly, monthly, yearly, etc.). Big wins/losses are also posted for a predetermined period.

Offer records within an offer table 100 may each relate to an offer announced on the network based personal wagering facility 12 in connection with a wager-format listing supported by a wager application 44. A feedback table 102 may be utilized by one or more reputation applications 50, in one exemplary embodiment, to construct and maintain reputation information concerning users. A history table 104 may maintain a history of wagers to which a user has been a party. One or more attributes tables 106 may record attribute information pertaining to wagers for which records exist within the wager table 94. Considering only a single example of such an attribute, the attributes tables 106 may indicate a currency attribute associated with a particular wager, the currency attribute identifying the currency of a wager amount for the relevant wager as specified by an offerer. Other attributes, such as odds given, point spread, etc. may also be included.

In another embodiment, user currency table 108 may include geographical based currency and currency conversion (to compare home-based currency with mobile-based currency if out of the home country). In this embodiment, when a user leaves their respective home country, if the new country has a different currency, a conversion of the home-based currency to the new country currency may be made and returned to the user to ease wagers.

Figure 4:
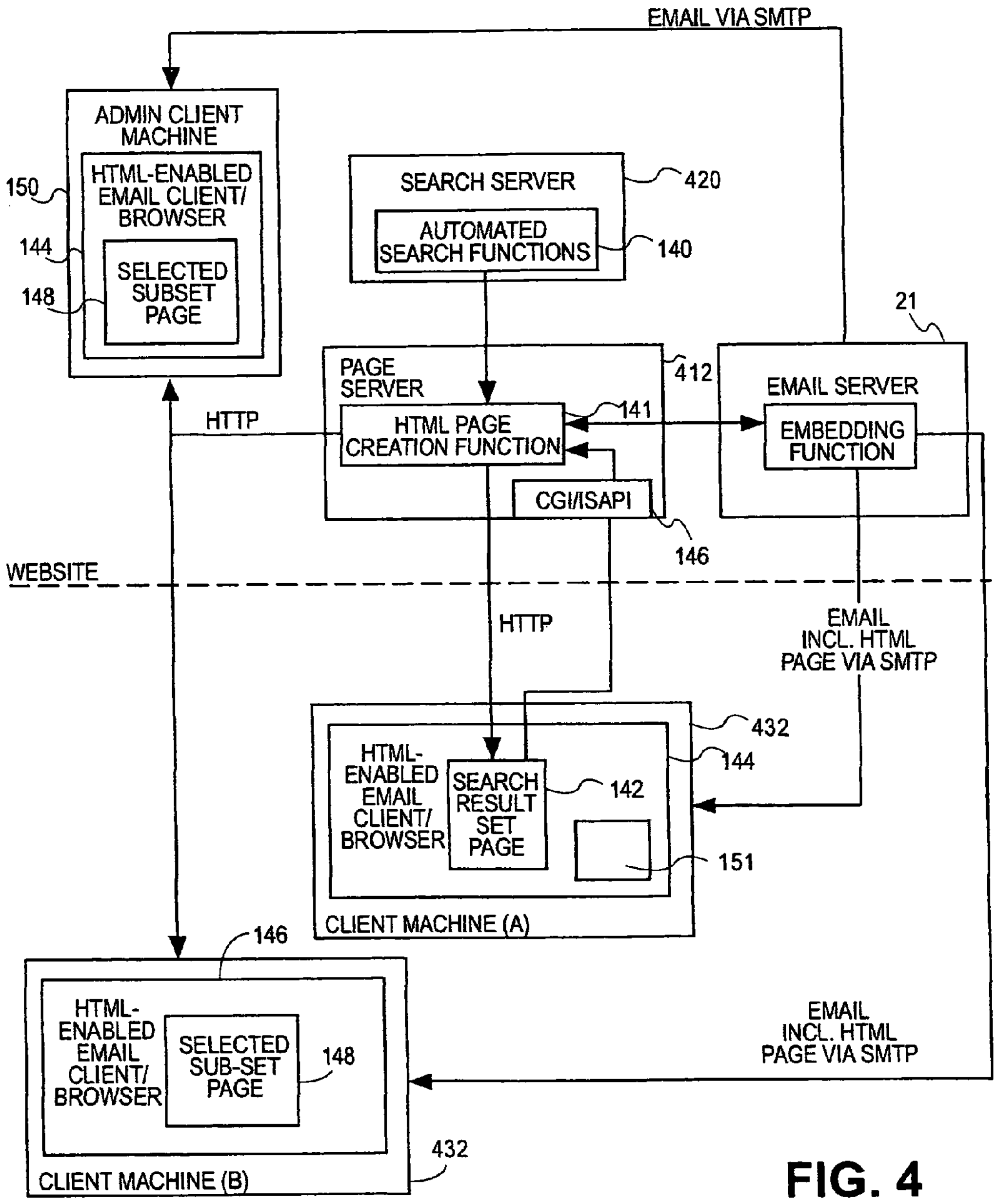
FIG. 4 is a block diagram illustrating an exemplary environment within which email alerts to users may be made when an event is available for wagering.

FIG. 4 illustrates a specific exemplary environment within which email alerts, text message alerts, and webpage alerts to users may be made when a user makes an offer of wager for a specific event. In one exemplary embodiment, an automatic telephone recording is sent to users instead of other alerts. The alerts may allow a user to be aware that a respective user is making an offer for wager within a wager range and for a specific event and allows the offerer to inform the users of particular wagers offered.

System 10 may provide an automated "watching" service to users, whereby an automated search is periodically conducted to locate wager offers that are posted to a website as well as being emailed or instead of being emailed, as identified utilizing specified search criteria.

In FIG. 4, search server 420 of system 10 is shown, by way of example, to perform a number of automated search functions 140 to provide the above-discussed automated "watching" services and to generate a result set of offers according to a specified search criteria. The result set may be communicated from the search server 420 to a page server 412 that generates a markup language document (e.g., an HTML page), for example, by populating a template with the result set to thereby generate a search result set page 142. The search result set page 142 may, for example, be an HTML document, or may be a text-based e-mail message that includes a network location identifier (e.g., URL) that identifies an HTML document embodying the search results. In FIG. 4, the search result set page 142 is shown to be communicated to an HTML-enabled e-mail client or browser 144 that executes in a client machine 432.

The search result set page 142 may include number of check boxes adjacent to each of the data items identifying the search result set. By checking the check boxes, the user is able to identify a subset of the search result set and to communicate the selected subset back to the page server 412 by selection of "submit" button presented within the search result set page 142. For example, the subset may be communicated as an e-mail message or an HTTP PUT request, or utilizing any other transfer protocol or communication. The page server 412 may execute a CGI script, or an ISAPI script, 146 that receives the communication of the subset of the search results, parses the communication to locate item identifiers (e.g., numeric or otherwise) embodied within the communication and communicates these identifiers to a page creation function 141. The page creation function 141 may then compose a new markup language document embodying the subset of the search result set.

The markup language document embodying the subset of search results may, for example, be communicated to a further user in one of two ways. In one embodiment, the page creation function 141 may communicate a URL identifying the created page to any email server 21, which may compose a text-based email message that is then communicated from the email server 21 to a client machine 432 of a targeted user. In this case, utilizing the URL embedded in the email message, the user of the client machine 432 may access the created markup language document utilizing a browser application.

In an alternative embodiment, the page creation function 141 may communicate a markup language document to the email server 21, which may embed the markup language document in an email message. The email message may then be communicated to an HTML-enabled client 144 executing on the client machine 432, which the user of the client machine 432 may utilize to view the markup language document. An example of this markup language document is indicated in FIG. 4 as being the selected subset page 148.

In FIG. 4, client machines 432 are shown to reside outside the context of a web site. Accordingly this embodiment describes an application which allows a first user of a client machine 432 (e.g., client machine (A)) to communicate a subset of search results to a user of a further client machine 432 (e.g., client machine (B)), both of which reside outside a web site or network based wagering facility.

An alternative application may allow the user of a client machine 432 to communicate the select subset search results of the search results to an administrator of a wager facility (or web site) that utilizes an administrator client machine 150.

Figure 5:
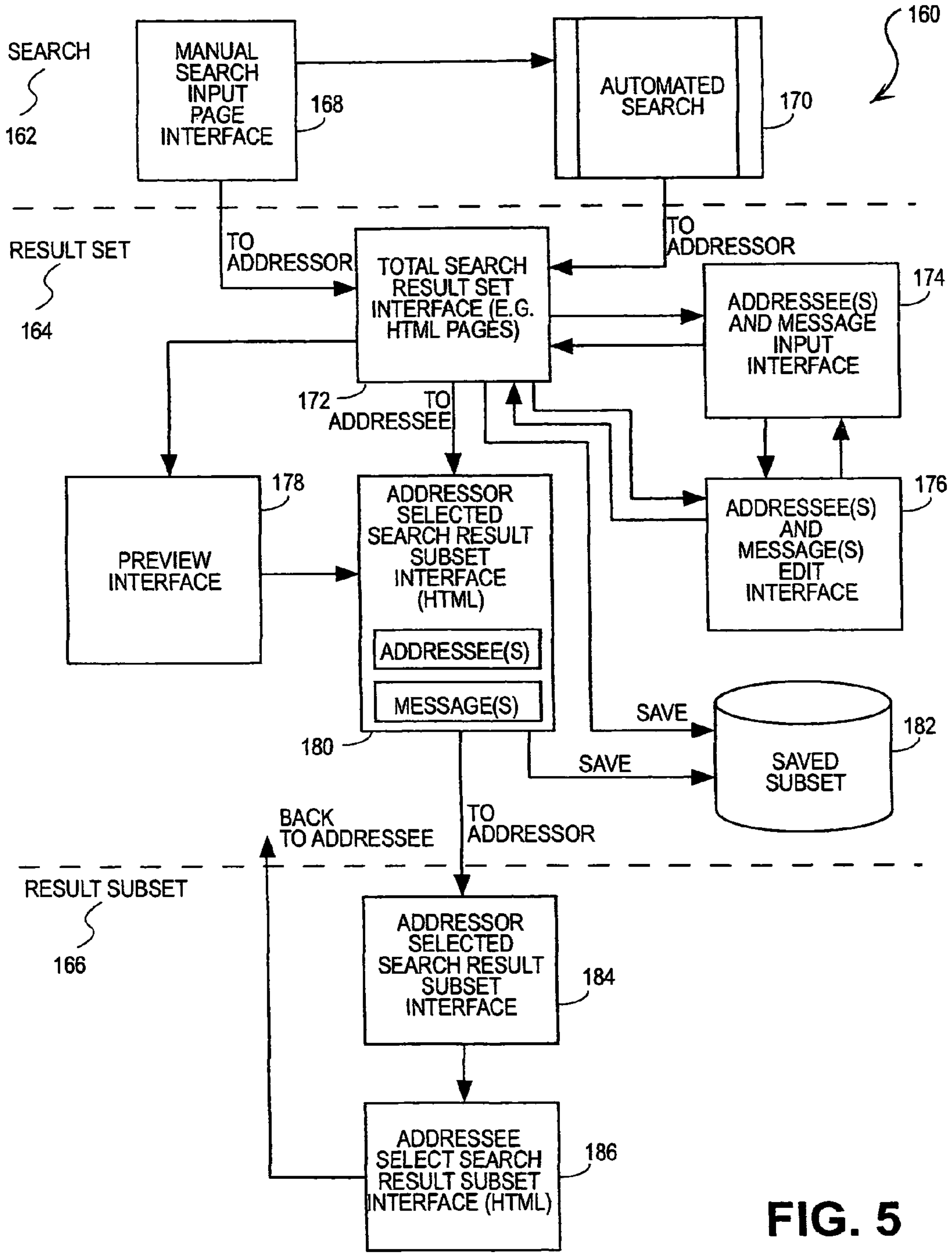
FIG. 5 is an interface map illustrating a collection of interfaces, according to an exemplary embodiment of the present invention, to facilitate communication between users.

FIG. 5 is an interface map 160, according to an exemplary embodiment, illustrating a collection of interfaces that may be presented to entities (e.g., users or administrators) to facilitate the communication of search results between such entities. The interfaces are furthermore categorized, for example, as comprising search interfaces 162, result set interfaces 164 and result subset interfaces 166.

A first user may be presented with manual search input page interface 168 that facilitates the input and specification of search criteria. The input into interface 168 may, in one embodiment, be stored as an automated search 170.

Regardless of whether a search is conducted as a result of a specific (e.g., unique) search request inputted into interface 168, or as automated search 170, a search result set may be presented in a result set interface 172. In one embodiment, the result set interface 172 comprises a markup language document in the form of an HTML page that lists a descriptor for each of the search results. Each descriptor may comprise hypertext linked to a document.

Each descriptor may furthermore be displayed adjacent a check box, which is user-selectable to mark a data item to be included within a subset of the search results to be communicated to a further entity. The interface 172 may further present a “submit” or “send” button that is user-selectable to communicate the select subset, together with a default message, to a default addressee.

An addressee and message selection input interface 174 may also be accessible from the result set interface 172. Utilizing the interface 174, an addressor entity may chose from a number of pre-defined messages to accompany the subset of the result set, and also specify one or more addressees.

An addressee and message edit interface 176 may also be accessible from the result set interface 172 and/or the input interface 174. Utilizing the interface 176, an addressor user may edit a list of potential addressees, and also edit or author messages presented for selection in the input interface 174.

A preview interface 178 may be accessible from the result set interface 172, and allow an addressor to preview the subset and messages to be communicated to the addressee. For example, the preview interface 178 may present the HTML page that includes hypertext descriptors of the data items of the search result subset.

A subset interface 180 may then be presented to the addressor for review. The subset interface 180 may include hypertext descriptors of the data items of the search result subset and may also include a listing of one or more addressees and a message to accompany the result subset (e.g., the default or user-specified message).

The selected search result may also be saved as a saved subset 182 from either the search result set interface 172 or by performing an appropriate user-selection within the subset interface 180.

The search result subset, as described within the exemplary context of an HTML document, may then be communicated to the addressee as a result subset interface 180 that may be viewable by the addressee (e.g., user). The result subset interface 180, as described by way of example above, may include descriptors for each of the data items of the subset, each descriptor may comprise hypertext. Accordingly, user selection of the hypertext may conveniently cause a retrieval of a full document included in the result subset. Further, each of the descriptors presented within the result subset interface 180 may also be presented in association with a check box to facilitate addressee or user selection from within the subset. Utilizing the check boxes, this addressee may then define a narrowed subset of the search result set, and utilizing interfaces similar to those described above, communicate a narrowed subset back to the original addressor, or to further addressees. This narrowed subset of the search results may again be listed within the context of a subset interface 186 and may include a message appropriate to the narrowed subset.

Figure 6:
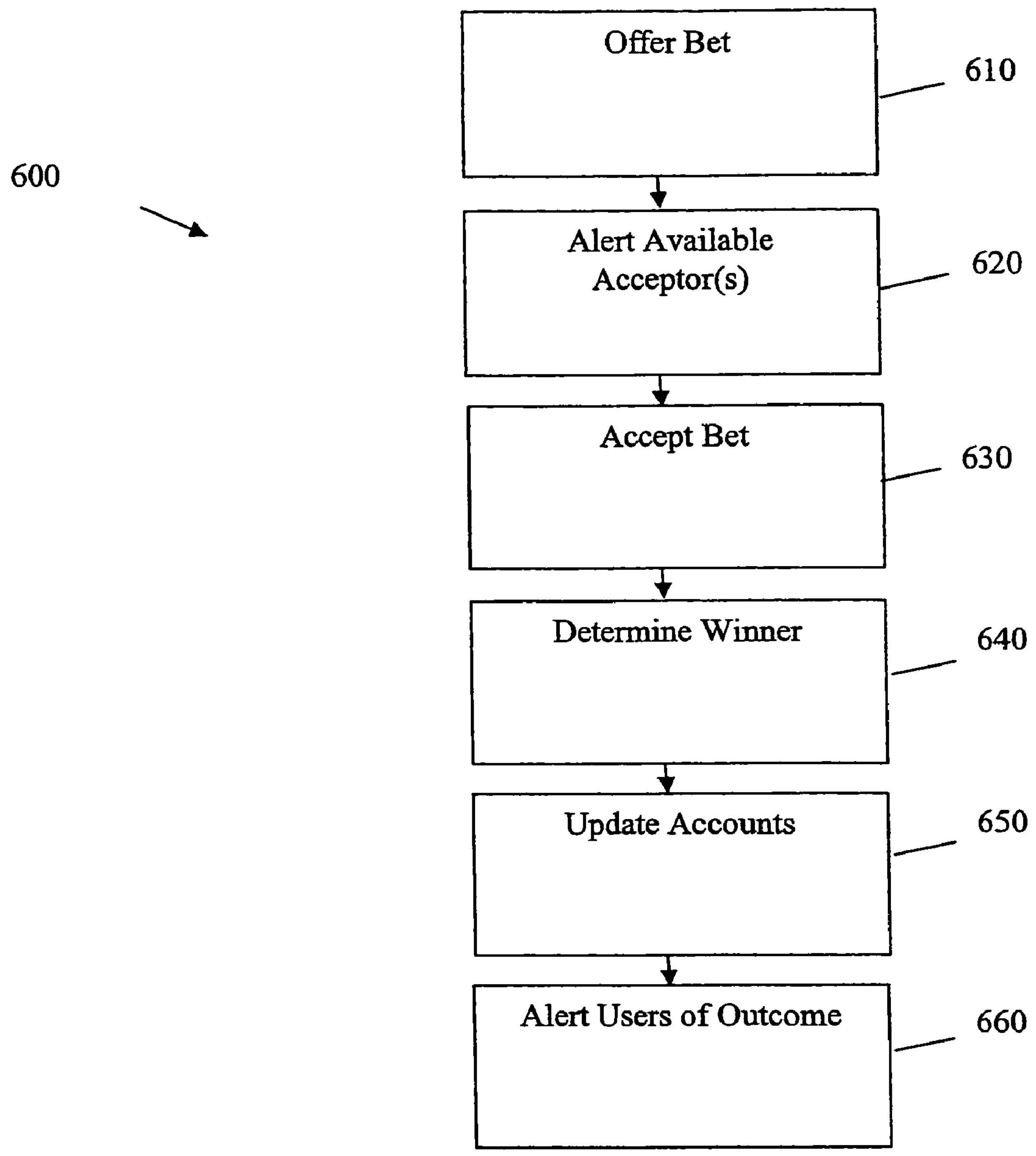
FIG. 6 illustrates a block diagram of an exemplary process for facilitating personal wagering.

FIG. 6 illustrates an exemplary block diagram of a process or method of an embodiment. In one embodiment a website is set up where any user can bet against any other user, any chosen amount, on anything. The bets may be for certain sporting events/games, matches or races. There may be bets made on elections, etc. In process 600, in block 610 a first person makes a bet offer (e.g., a first person makes a bet offer of $10.00 that the Mavericks will get beaten by the Miami Heat in game 2 of the 2006 NBA championship series). An email or other alert is sent out alerting available acceptors of the bet. The available acceptors are determined by user preferences, which include teams, individuals, events, etc. that the user finds acceptable to wager on.

In one embodiment the user preferences are continuously updated for new events. In this embodiment, the website continuously lists new events under categories (e.g., worldwide: baseball, basketball, hockey, soccer, boxing, car races, horse races, golf, rugby, non-sporting events, etc. In one embodiment, a user can specify the country to find events. When the events are listed, a user can choose to add an event to their preference list by selecting the event (e.g., a checkbox, clicking on the event, etc.).

In block 620, a user accepts the offered bet. The first person to accept the bet closes the bet, unless the first person is allowing a certain number of bets (e.g., 2 bets, 5 bets, etc. for a set amount/value or item(s) each). In one embodiment, the first person transfers the amount of the offered bet into an account (e.g., an escrow account, neutral account operated by a website, an agent account, etc.). The person taking the bet transfers the amount of the bet as well. In one embodiment, if the user has the amount of the bet in their account, the funds are automatically transferred to a neutral account. After the results are in, the money is transferred to the winner minus a service fee (e.g., 10% total wager, set fee of $0.50, $1.00, etc.). The first person may also set handicap (e.g., in a baseball game, 1 run; in a football game, 7 points, 10,000 votes in an election, etc.). The originating bettor (i.e., offerer) can also place odds (e.g., 2-1, 3-1, etc.), point spread, and handicaps. In this embodiment, selection boxes (e.g., drop down menus, fill in menus, etc.) allow a user to select odds/points/etc. The website then reflects a payout amount for a winner based on the odds. If points are given for an event (e.g., runs in a baseball game, points in a basketball/football game, votes in an election, etc.), once a winner of an event is determined, the points are either added or subtracted from the final results. In this embodiment, the winner of the wager can have a losing side/team/etc. of an event, yet still win the wager based on the points. In one embodiment, where legal, the website may have links to websites with odds, etc. (e.g., sport books, newspaper sport sections, casinos, etc.) so users can check current odds, handicaps, etc. Other embodiments do not require the payment of the service fee. One embodiment does not list or transmit any information relating to assisting users in placing wagers. In another embodiment, the personal wagering facility does not require any funds to be transferred before, during or after an event. In this embodiment, the personal wagering facility or website only facilitates wagers and it is up to the users to complete wagers after an outcome of the wagered event is known. In this embodiment, the personal wagering facility or website is not a gambling business.

In another embodiment, users wager for fictional items, such as digital images relating to property or real property. For example, wagers can be made for fictional items, such as a car, jewelry, airplanes, an island, gold, diamonds, etc. Artwork and photos can also be wagered for. These fictional items, if won, are transferred to and displayed on a user's personal page on the website. Users can use points to purchase fictional items at a fictional item depository, i.e. a virtual store. These items can be traded for between users and wagered for between users. The fictional items do not have any monetary value and are traded for and wagered for strictly for entertainment purposes. In one embodiment, the items are limited to a certain amount of images. In another embodiment, users place a fictional point value (or play currency) to images of items that the users can upload themselves. These uploaded images cannot contain inappropriate material. The users can upload personal works of art that they made or other images they obtained legally and display for trade, offer for sale via points or play currency) and can wager for the items. If users do not follow through with the transactions of the fictional items or artwork, reputations can be effected.

In one embodiment, a user can choose to either wager for points/credits, currency or both. In another embodiment, users can wager for personal possessions (i.e., property, real property, intellectual property). In this embodiment, users can offer to wager an item that they have ownership to or a percentage of ownership. Items such as stocks, bonds, personal property, real property, etc. can be offered to wager. In one embodiment, if users from different countries do not want to wager in currency, the users may wager for commodities, precious metals, jewels, etc. Countries can wager exports against other Country's exports. In one embodiment, personal property needs to be valued. In this embodiment, a user can arrange for a third party to appraise the personal property. In this embodiment, as the personal property is given a value, the users will know what they are wagering for. User's real property is appraised as well.

In one embodiment, users can purchase music, songs, albums, ringtones, wallpaper, etc. from an online store or a third party and wager the purchased item(s). The item can be downloaded or transferred to a winner of a wager. In another embodiment the item is wagered on before the purchase is made. In this embodiment, when the winner is determined, the losing wagerer purchases the item and the item is transferred to the winner.

In another embodiment, other items that may be wagered may have personal value. For example, a City may wager against another City on an event where the wager may include a mayor doing something (e.g., an act, service, etc.; e.g., shaving his/her head, wearing a type of clothing, giving a certain speech, etc.). Users can wager against other users and may have to do a service or perform an act. For example, a husband that loses to a wife may have to take her to dinner, buy her a car, take her on vacation, etc. In these embodiments, the winner can have displays on their personal page or on a website page (e.g., a main page, etc.) that announces the winner. If the winner does not perform by doing what they wagered on, reputation is effected (e.g., a negative feedback can be given). In one embodiment, pictures/video can be uploaded to a website of the loser performing services or paying off the winner of a wager.

Multiple bets are handled similarly. Also, users can set up lists of people they like to bet with. Therefore, users can set up a list/group of friends that can bet each other. The users can close the lists as well so only the users in the list can bet with each other.

Advertisements of events, products, or services can be placed on the website to raise revenue (e.g., a big boxing match, horse race, car race, soccer, golf, elections, products, services, restaurants, banks, etc.). Advertisements can be maintained in a database for selection (e.g., changing advertisements) for display on a webpage or in alerts. Displays of total bets on events can be selected for display for each user. Users can set limits of wagers. For example, a user may limit their monthly, yearly, etc. betting amount or set the amount of losses to a maximum value amount for a period, such as a week, month, quarter, year, etc. In another embodiment, the maximum betting amount or maximum amount of losses can be predetermined for a user. This can be based on different factors, such as income, outstanding credit/debt, savings, etc.

In block 640, a winner is determined. Alerts (e.g., e-mails, text messages, etc.) are sent announcing receipt of funds, and transfer of win/loss amounts. Announcements of events are also sent out as reminders. Users that set up friend lists/groups can have automatic emails sent to others on the list when they offer to make a wager. Wagers can be "upped." For example, an originator of a bet can bet $10 on a baseball game. The taker of the bet can accept and offer or "up" the wager to $20. The originating better can take the "upped" wager or decline.

The network based wagering facility receives all bets and determines winners and losers. In a tie, the bettors get their wager funds returned minus the service fee. It should be noted that other embodiments do not charge a service fee. Still other embodiments may only charge a registration fee (e.g., yearly fee, monthly fee, one-time only fee, etc.) The networked based wagering facility can be set up wherever gambling is legal. That is, the hardware and software running on the hardware are located in a location where gambling is legal.

For example, states that allow wagering (e.g., Nevada), Australia, offshore facilities, etc. In other embodiments where the network based wagering facility does not accept a service fee based on a wager, does not accept a subscription fee, and does not accept any fees from users, the network based wagering facility can be located anywhere.

In block 650, accounts of the users are updated. That is, funds are transferred from a neutral account to the winner's account. Win/loss statistics are updated for each user. The amounts of win/loss is updated for each user and displayed or made available for display by the user's selection. In block 660, alerts are transmitted to the users informing them of the outcome of the event.

Horse racing is usually bet in a paramutual way. However, in one embodiment, through the website people can bet whether a horse wins or not, or places, shows, etc. Olympic games and world cup soccer games may be wagered on. In one embodiment, users may wager on multiple events where the total outcome of the events determines a winner. For example, a user may bet on all/part of college football games on a specific date. The user with the most picked winners is declared the winner. Users may make seasonal pools for events throughout s specific season (e.g., college football season, basketball seasons, etc.).

User's total wins/losses are kept in account managing files or in a database. This way a user can report wins and losses for tax purposes; can use the records for personal finances, etc.

In one embodiment, a hyperlink to a finance company can allow qualified users to obtain funds for betting. Once a user is funded, the funded amount is transferred to the user's account. When the user makes a bet, the necessary funds are transferred to the neutral account.

In one embodiment companies/corporations/businesses/etc. can have a company account where participating people (e.g., employees) can pool funds. In this embodiment, companies/corporations/etc. can bet against one another. The company account can also be used for company wagering pools. The account can be used for charitable donations as well.

In one embodiment users can wager for goods or services. Items, such as dinners/lunches/products/massages/memberships/sporting tickets/house cleaning/, cars, etc. can be wagered by purchasing gift certificates from participating restaurants/stores/clubs/dealerships, etc. or purchasing the items from participant vendors. For example, if a $25 gift certificate is purchased, $25 plus the service fee is transferred from the user's account. Upon a user winning, the gift certificate is either mailed or emailed to the winner. In one embodiment, a wager offer is made for the goods or services. Each user (offerer/accepter) transfers funds to the neutral account. When the winner is determined, the funds are transferred to the vender. The vender then sends out a gift certificate (email or mail), or ships the goods or proof of purchase for services to be rendered.

In one embodiment where the personal wagering facility collects funds for users, users must have valid bank accounts or check cards. Funds must be verified in advance of a wager. When users set limits on losses on a weekly or monthly basis, once the limit is reached, no other bets can be made until the following month, week, etc. Users that want to up their limit may override the limit for an event.

Users can send thank you emails, or "rub it in" emails by selecting a type of email from the website. Users can select to leave funds in their account, transfer to a bank account or receive a check for the amount of funds in their account.

In one embodiment, users can offer/accept bets from cellular telephones or PDAs through a downloaded program, such as a java program. This allows users to check accounts, transfer funds, check status of bets, send emails, etc.

In one embodiment, users can select to donate any portion of their winning amount to various charities. This can be set up on a constant basis or individual donation basis. The choices of charities are given to the users on a web page or through hyperlinks in emails. Users can also select desired charities to donate to through a cell phone or other wireless device.

In one embodiment, the determination of winning can be made by a third party. Once the determination of a winner of an event is made, a database is updated to include winners and losers. All bets are entered into another database. A program reads the bets and sets a flag for the winners. A program reads the database, the winner, loser, bet amount and event and enters the information in an alert to the users (e.g., email). The accounts are updated as well with the winning amount.

In one embodiment, betting "pools" can be formed for events, such as the Super bowl, college bowl games, college football games, NFL games, baseball games, etc. Different types of pools may be set up. There can be winner take all, half-time and end of game, and quarter by quarter (i.e., for football games). The pools can be started by any user. The user can set the wager, e.g., $1, $2, $5, $10, $100, $1000, etc. per square (e.g., 100 squares representing 0-9 digits across (first team) and up/down (second team)). One embodiment has the users pick a square that is available. The other embodiment randomly selects an available square and assigns that square to a user. When all 100 squares are filled the pool is closed.

The originating user can determine if there are limits on squares per wagerer. For example, the originating user can select two square max, three square max, no max, etc. If there are available squares a certain preset time before the event (e.g., one day, five hours, two hours, etc.), emails are sent out to entrants informing them of available squares. The entrants can then purchase available squares or decline the offer. If there are available squares by the event time, the available squares become tie squares. In one embodiment, in the case of a tie, the users get their money back minus a small service fee (e.g., 5%, 7%, 10%, $0.50, $1.00, etc.). In other embodiments, no service fee is charged. When the event is over, the winning square holders receive winnings minus a service fee for embodiments having a service fee. The winners will have their square(s) match the end digit of a sporting event (e.g., for a football score of 24-7, the winning square is 4 and 7 for the winning team.

In one embodiment after a winner is determined, all contributors are notified of the winner and the winners account or email address. In this embodiment, the users are responsible for their own wagering. That is, the wagering facility or website has nothing to do with wager amounts or fees and only facilitates the requests of the users. The losing participants then can arrange to forward the wagers to the winner by any acceptable means agreed to by the winner. Alerts are sent to the winner and losers indicating the status of the wager pool.

In another embodiment, users can set up their own personal page (e.g., a MyBetPlace) listing their favorite teams, sports, events, politicians, vendors, actors/actresses, singers, bands, etc., that they like to wager on. On the personal pages, the users can have photos/videos/music uploaded (as long as there are no copyright violations), describe themselves, receive messages from other users, etc. The personal pages may be open to all users or closed to specified users. The personal pages may list bets outstanding, wager history, performance, watch lists, offers to wager, polls, links to other websites, links to other personal pages on different websites (e.g., Myspace.com®, etc. A user may list open offers to wager and accepted offers to wager on a portion of their personal page. Additionally, the users may design the page as they see fit with appropriate content. In one embodiment, the personal pages can get rated by other users. In yet another embodiment, a user may have a link to other user's personal pages that have similar favorite teams, athletes, etc. In one embodiment, if the user has a team logo on their personal page, the logo can have a link. This link can direct the user to a webpage having a listing of users that have open wager offers against their team, athlete, sporting event, etc. A similar link can be set up for non-sporting events as well. These links and webpages make it easy for a user to find wagers they are interested in.

In one embodiment, groups can be formed based on a favorite athlete, team, actor/actress, stocks, etc. In this embodiment, users join a group that is started by a moderator. In this embodiment, the group can have a name assigned to it and the moderator selects whether the group is public or private. The moderator selects the layout of the group. In this embodiment, group total wager statistics can be displayed. The group's theme may be fore a specific team, such as the Angel's, Yankees, etc. Members that join are alerted of existing groups that have a common preference. In one embodiment, the themed group receives alerts from other themed groups that may wager against each other. For example, if a team or athlete of one group is competing against a team or athlete preferred by another group, a group that makes a wager offer may want to wager against the group preferring the competing team. The group preferring the competing team is alerted of the wager offer and can accept the wager offer, turn down the wager offer, or submit a counter offer. In this embodiment, if the wager offer is for an item, currency, property, etc., the group divides the amount evenly. In another embodiment, group members may opt out of the wager offer. In another embodiment, the wager offer may be for performing an act (e.g., wearing the other team's emblem, shaving their heads, etc.). In this embodiment, the losing users of the losing group can send pictures or videos to the group page or to the competing group's page for proof of completion of the wager and for entertainment purposes.

In one embodiment, users can "call out" either specified users, groups or unspecified users, groups to make a bet with them. In the "call out," an email is sent with enticing language (e.g., bet me if you dare!, if you're not chicken . . . , etc.), or an alert can be posted on a main page of the website. In this embodiment users or groups can entice other users or groups based on their message. This also adds to entertainment value.

In one embodiment, if a user wins a wager for a good, service or personal property, a webpage allows the user to offer the item for trade, sale or to be used in another wager if the user decides to do so. Users can showoff goods, services, personal property, etc. that is won in a wager on their personal page. In one embodiment, users can send text messages to other users. In this embodiment, the text message is forwarded to the specified user's personal page. The specified user can select to delete the text message or not. The text message can be sent through a user's cellular telephone or personal computing device. In one embodiment, random text messages are posted to a main webpage after screening for content.

In one embodiment, other gaming sites can join in (if legal under the jurisdiction where the personal wagering facility or website is maintained) and offer bets to any specified amount of users. For example, another online sports book, casino or website housing a casino or sports book may want to bet $20 multiple times (e.g., 50 times, 100 times, etc.) for a certain event, with specified odds. These other online betting websites must become an entrant just like an ordinary user. For the other online betting websites, a message on a homepage of the website may specify the grounds for the bet and any other advertising (for which they may be charged a fee).

In another embodiment webpages include advertised offers to wager to users. Users click on a wager offer and can select to wager or not. Betting pools can have squares that can be randomly selected to users through a random number generator of available squares or other pools users can select a square. In still other embodiments, users select squares and numbers are randomly assigned to the border of the betting pool square. In some embodiments, the website facilitates wagers by displaying the advertised offers to wager, which can be accepted by other users. The webpage can be organized in many ways. The website can be arranged by wager amount, teams, athletes, candidates for elections, Country, States, Cities, sport, event, etc. The user can search through the website for wagers on their desired event for the amount they desire to wager that is in a desired range. Emails can be transmitted to reflect the wagers and status. Users can forward funds to a third party holding account or trust account, such as an escrow account. The trust account is notified of the winner and forwards the funds to the winner of the wager (unless a tie) and in one embodiment, transfers a handling fee portion to the facilitator's account.

In one embodiment, a webpage organizes a user's personal bet status (e.g., MyBets) lists outstanding bets, winning bets, losing bets, totals, statistics, history of bets against specific users, etc. In one embodiment, the personal bet status webpage allows a user to check on outstanding offers of their own (i.e., to see how many times the wager offer was accessed), check outstanding wager offers of users they previously or are currently wagering against. In one embodiment, a user can leave feedback/reputation information regarding completed wagers or wagers that were never completed. In this embodiment, a user selects a feedback link and can enter information regarding a wager for the other party to a wager. The personal bet status page indicates to a user whether they need to leave feedback and whether feedback has been left for them. Messages can also be accessed through the personal bet status page. The personal bet status page organizes all of a user's wager information.

In yet another embodiment, users can use a credit card to transfer fees to a third party. In this embodiment, the third party can be located in a Country where online gambling is legal. The third party can then transfer the funds to a holding account for the wagerers. When a winner of a wager is determined, the third party receives the funds for the winning wagerer. The winning wagerer is notified and the funds can be returned to a bank or credit card along with the winning amount, or the wagerer can choose to leave the money or a portion of the money in an account in order to make another wager. In another embodiment, wagerers do not place wagers themselves. In this embodiment, wagers relay wager information to an agent located in a Country where online wagering is legalized. The wagerer transfers funds to the agent. The agent then places the wager for the user. If the user wins, the winnings are transferred to the agent. The agent then places funds in a user account or transfers the winnings to the user.

In another embodiment, the website does not receive any portion of a wager as a fee. In this embodiment, users can pay a subscription fee for use of the website if required. If users decide to wager against each other, the users are solely responsible for the receipt/payment and facilitation of winning wagers. In this embodiment, the users can transfer lost wagers to the winner in any means agreed on between the wagerers. For example, a user can use a wire transfer service, third party transfer service, send money orders, cash, bonds, gift certificates, gift cards, merchandise, etc. If a losing wagerer does not pay the winner, the winner can leave negative feedback for the user. In another embodiment, a wagerer that does not pay can be banned from the website either immediately, upon non-payment of a predetermined number of wagers (e.g., two, three), or required to pay the winner and will be blocked out until the winner is paid. As the decision is based on the winners reporting, if a winner falsely reports a user did not pay the winner, the loser can forward a receipt as proof of payment. In this case, the winning user can receive a negative feedback or can be banned after a predetermined number of false reports (e.g., two, three, etc.). Users can select to wager against users based on the reputations based on user feedback.

Where the users are responsible for handling their own wagers, the wagering facility or website reports winners of events, may or may not receive a subscription fee for use of the website, and does not receive fees based on any wagers. The users do not have to make any wagers when subscribed to the website. The subscription fee arranges for the facilitation of users to make wagers, where the wagers do not to necessarily include monies or items of worth. If the users choose, they can make bets without monies or items of worth.

In another embodiment, the users receive a credit of points in their accounts for the subscription fee. In another embodiment, the use of the website is free to users. For example, a user may receive 1000, 10,000, etc. points in their accounts. In this embodiment, the users can make wagers for points, where the points are not worth any monetary amounts. In this embodiment, the wagering is strictly for entertainment purposes. The other enhancements of facilitating wagers remain, albeit no money is involved in wagers.

In one embodiment, based on the number of points, the users can be awarded a different level or grade. For example, if a user obtains 100,000 points, the user can be ranked in a first level; if a user obtains 1,000,000 points, the user is ranked in a second level, etc. In one embodiment, users cannot wager points against other users in higher level rankings. In another embodiment, users in a higher level ranking must give odds or handicaps to users of a lower level ranking. In another embodiment, winners can receive digital trophies to display on their personal webpage or place.

In yet another embodiment, users can use webcams when logged in to the website. The video from the webcams can be displayed on the user's personal webpage or place. The user can also select which other users are able to see the webcam images. The webcam can enhance the use of the website as groups of users can see other authorized users and vice versa. In one embodiment, all users in a personal or private group can see all users in the group that are logged on when their webcams are turned on. In this embodiment, the display of the webcam images is sized according to the number of webcam images. The personal images and webcams are monitored by users and monitors for any inappropriate displays.

In still another embodiment, video images of key moments in an event can be displayed on the website with permission or licensing from the owner. In one embodiment, the key moment may be the end of the event and include a final score, event result, etc. In another embodiment, the key moment for a wagered event is recorded and transmitted to wagerers, for example in an email (i.e., text, video, or a combination of both), video on the website or transmitted to a portable device.

In another embodiment, since users may be from many countries with different languages, translation of offers to wager and acceptance to wagers is made through either a website or in electronic messages (e.g., email, text messages, etc.). In another embodiment, a user can choose the Country that they are from to display a webpage based on the user's Country's language.

In one embodiment age verification is made before allowing wagerers to place a wager. In this embodiment, various proof of age must be submitted and documentation is submitted by users. In this embodiment, users must also agree to verify their age. In one embodiment, the age requirement is based on the Country that the user is a citizen. That is, each Country or state may have a legal limit for wagering.

In one embodiment, trends of user's wagers (i.e., winning/losing) are maintained. Based on the types of wagers, averages of wagers, etc., controls are placed on users to verify users want to place new wagers or not. That is, the website can control or limit users wagering based on habits, trends, averages to help users control wagering and assist users from exceeding typical wagering habits. In one embodiment, a hold can be placed on a wager and a user would have to verify their intent. In this embodiment, a user is given the history, averages, totals of their wagering. Based on reviewing the wager history, a user may decide not to continue with a wager or to continue with a wager, regardless of the wager history.

In one embodiment, wagers may be placed in the middle of an event. That is, after an event has begun, a user may offer a wager or accept a wager. For a wager offer placed before an event begins, the offerer of the wager can decide whether or not to let a user accept. That is, once a user accepts the wager after the event has begin, the wager offerer can rescind the wager, amend the wager, or let the wager be accepted.

In one embodiment when alerts are sent (e.g., wager alerts, winning alert, losing alert, etc.), advertisements are included in alerts. In one embodiment, advertisements are randomly selected to be included in alerts from an advertising database that includes various advertisements. In another embodiment, advertisements are selected based on location of the user. In still another embodiment, advertisements are selected based on user preferences. In yet another embodiment, advertisements are selected based on a user's past wagers. In this embodiment, similar or same teams, athletes, events, etc. are user to select advertisements. For example, if a user placed or accepted a wager for a specific team, an advertisement may relate to a player on the team, the team, merchandise for the team, an event relating to the team, goods or services typically advertised for the event (e.g., similar advertisements/commercials that would be played during radio/televised events).

In one embodiment, advertisements are placed on each user's personal page. In this embodiment, advertisements are randomly selected to be included in alerts from an advertising database that includes various advertisements. In another embodiment, advertisements are selected based on location of the user. In still another embodiment, advertisements are selected based on user preferences. In yet another embodiment, advertisements are selected based on a user's past wagers. In this embodiment, similar or same teams, athletes, events, etc. are user to select advertisements. For example, if a user placed or accepted a wager for a specific team, an advertisement may relate to a player on the team, the team, merchandise for the team, an event relating to the team, goods or services typically advertised for the event (e.g., similar advertisements/commercials that would be played during radio/televised events).

In one embodiment, advertisements are selected from a database based on a user's preferred athlete, team, event, etc.

In this embodiment, the selected advertisements are related to sponsors or endorsements of the user's preferred athlete, team, event, personality, etc. For example, if an athlete/team/etc. receives endorsements from an athletic shoe company, a clothing company, a restaurant, etc., if advertisements exist in a database for the sponsors or endorsers of the athlete, these advertisements are selected to be included on a user's personal page or in the alerts sent to the user. In yet another embodiment, advertisements are further targeted to users based on either a users age or income.

In another embodiment, advertisements sent in alerts or displayed on a user's personal page are selected based on what is wagered. In this embodiment, if a wager offer is for goods/services/commodities/currency/etc., advertisements related to these are selected from an advertisement database for display or alerts.

In one embodiment, periodically users are asked to take an optional survey. In the survey, users are asked questions where the answers target advertising. In this embodiment, the users are given an incentive to fill out the survey. In this embodiment, the users are given points, play money or credits that they can wager, trade or purchase fictional or art related items. In another embodiment, users are given fictional items.

In yet another embodiment, the users are periodically given a hint and must search the personal wagering facility or website for a link or an item. The users that find the link or item and either click on the link or report the item are given points, play money or fictional items. In this embodiment, the users must traverse the personal wagering facility or website in search of the link or item. In one embodiment, the users find hints to other hints in search of the specific link or item being searched for. In these embodiments, as the users traverse the website, they are shown various different advertisements that they can choose to view now or later. In one embodiment, the users can choose to view all advertisements later. In this embodiment, the users can view advertisements page by page. In another embodiment, the user will be shown the advertisements in a video (e.g., commercials) before they are given their reward. In one embodiment, the users can selectively choose which advertisements to view later. In this embodiment, the more advertisements a user views, the more points, play money or fictional items the user will receive. A user can also choose to not view any advertisements, which will default a user to the default value set for the reward.

In one embodiment, when a user obtains a reward, the user's reward and account name or user name is displayed temporarily on a main display page. In another embodiment, as only a limited edition of fictional items may be available, users can add the fictional item to a wish list. If the fictional item in the user's wish list is put up for trade or for a wager, users with the item in their wish lists are alerted.

In one embodiment additional wager offers can be included in the alerts sent to users. These additional wager alerts may include wager offers from the same wager offerer in the wager between the participants, or other wager offers for the same team, athlete, event, etc. that the winner, loser, alerted user, etc. may have wagered on previously. In another embodiment new wager offers are selected from a database where the selection is based on the user's location (e.g., teams within a city/state, events taking place in the city state, events where local teams are participating, etc.). In one embodiment, a portion of a user's personal page contains a section of targeted wager offers. A user can select the offered wagers to view or delete the offered wagers from their personal page.

In one embodiment, trends are maintained for wagers offered/accepted for events. In this embodiment, alerts are made to users either through alerts or the website to indicate "hot" events. That is, users can select a trend page on a website to see a graphical representation of the number of wagers and the amounts of the wagers. Top wagers can be illustrated that show, for example, the top ten events based on number of wagers, amount of wagers, etc. In another embodiment, users can select trends based on points given/requested and odds requested for wagers. In this embodiment, users can see average points given/taken, odds, etc.

In one embodiment, only events listed on a website can be used for placing wagers. In this embodiment, a user can select an event from the available events in order to place a wager offer. The limit to listed events facilitate winner determinations. In another embodiment, users can request an event be listed that is not listed on the website. In one embodiment, alerts are sent or displayed, or polls are taken with the requested event to query users about interest. If a predetermined number of users (e.g., 100, 500, 1000, 50,000, etc.) respond to the query positively (i.e., they would be interested in wagering on the event), the event can be added to the event listing. In one embodiment, event listings are created based solely on user input from polls. In another embodiment, events listings are created based on "hot" current events. In this embodiment, if a current event is very popular (e.g., based on a predetermined number of website visits/hits or where an article is accessed for a predetermined amount of times (e.g., 10,000, 20,000, etc.), and/or an action or result is about to occur (e.g., whether or not North Korea would test a nuclear weapon within a predetermined time, whether a person will be found guilty or not, etc.), an event can be added to the wagering facility or website. It should be noted that in certain events, such as elections, a winner of a wager is only determined when the election results are official. In one embodiment, based on a predetermined number of accesses to a topic or article relating to an event, an automatic poll is created for users to vote on. In one embodiment, a pre-selected number of new polls created due to hot events/topics are displayed on a webpage. In one embodiment, advertising is selected from a database based on the "hot" topic/events and "hot" polls. In one embodiment, users interested in new "hot" topics/events and/or new "hot" polls are alerted either by a main webpage, email, text messages, on their personal pages, or any combination.

In one embodiment, trends of polls and events/topics can be selected to be displayed (e.g., a main webpage, personal page, etc.). In this embodiment, a user can see the trend on a day-to-day, hour-to-hour, etc. basis. The trend gives the user an idea if the poll/event/topic is increasing/decreasing in popularity. The more popular an event becomes, the more users may want to wager on the event or vote to have the event listed.

In one embodiment, as the events or topic is "hot," a user discussion is available for the users of the wagering facility or website to discuss the issues. In the discussion webpage, users can argue their views, make statements, etc. Also, in the discussion page, users can call out other users and make wagers on available event listings. The use of the discussion page can bring out emotions of users to facilitate or make their minds up about wagering against other users. Advertising on the user discussion page can be selected from a database based on the discussion topic(s).

In one embodiment, polls are displayed on a webpage and users can input an opinion or vote for the polls. In another embodiment, users can transmit their opinion or vote for a poll through a portable device or through email. In these embodiments, the polls can be directed to any wager listing. For example, a poll may request user's opinion or votes for awards, such as the Oscars®, Emmys®, Grammys®, ESPYs®, etc. In one embodiment, the users can only provide their opinion or vote once per poll. In one embodiment, advertisements are selected from a database based on results of the polls. For example, if a poll for choosing who a user believes will be best actress, advertisements related to the leader of the poll (e.g., new movies, products that the actress endorses, etc.) can be displayed more often than other advertisements.

In one embodiment, for entertainment or educational purposes, since users may wager on elections, candidates can have live or delayed debates displayed on the website. Candidates or parties can advertise for themselves in preparation for elections.

In one embodiment, links to sports news and non-sporting news are displayed on a webpage. This information allows a user easy access to research an event they may want to wager on. Also, the news links make it convenient for users to find "hot" topics as the topics/events that have the most hits/accesses (e.g., viewed the most) are listed. This is a convenient way for users to stay abreast of the news. In one embodiment, users can set up their personal pages with topics that they are interested in. In this embodiment, the user's personal page has information or links to information the user wants to see. This saves a user time by having their personal page set up so they can access topics/news they are interested in without having to search for the information. In one embodiment, advertising on the user's personal page is selected from a database based on the selected topics/event links.

In one embodiment, advertisements are targeted based on an amount of wager. In this embodiment, if a user makes a small wager, advertisements can be targeted towards goods or services that are in the price range of the amount or worth of the wager offer or the amount or worth of the total wagered.

In some embodiments, the wagering facility or website does not have any payment facilities or mechanisms as the wagering facility or website does not partake in any wagering or part of wagering. In these embodiments, since the wagering facility or website does not handle service fees, act as an escrow service, or charge any subscription fees, the wagering facility or website only provides an entertainment service to users. In these embodiments, it is the users that decide whether to wager or not, what to wager for, what the odds are, and whether to pay a winner or not. Since the users are responsible for handling all monetary transactions or wagers that include goods/services/currency/property, the users are responsible for abiding by their Country's or State's laws. In this embodiment, since the wagering facility or website is not partaking in wagering, the wagering facility or website exists for entertainment purposes and can be located at any desired location regardless if online gaming/casinos/etc., are legalized or not. Additionally, since the personal wagering facility or website does not collect/transfer/retain/maintain or even come in contact with monies related to wagering, these embodiments do not break any money transfer/wire/etc. laws related to online gaming.

In one embodiment, users can wager on multiple events with another user. In this embodiment, the wager offerer sets what is wagered for and any odds, points, handicaps for each event. The outcome of the total of the events determines the winner of the wager. For example, if a user makes a wager for five events, whichever user has selected the winners of at least three out of five events is the winner of the wager. In another embodiment, users can wager for multiple events over a complete sporting season. Groups can be formed for these multiple bets. For example, a season based college football/basketball wager pool can be created based on the multiple wagers. In one embodiment, the wagering facility or website creates a seasonal pool for users or groups to wager on. In this embodiment, users select a seasonal sport to wager on. A page with each periodic (e.g., weekly, bi-weekly, etc.) game appears with check boxes and/or drop down menus. A user can select the winners or select scores for each competing team. Pools are therefore formed either based on the number of winners, the closest points chosen, etc. In one embodiment, a user selects the criteria for the pool, such as each user's wager amount, type of pool (winner based, point based, both, etc.), involved conference or division, etc. Once selected, if a pool already exists, a user can join and make wager selections. If a pool does not exist for the criteria, a user can start a new pool based on their criteria. In these embodiments, other users that have pre-selected preferences relating to these pool wagers are alerted when a new pool is formed and before the pool is closed (e.g., right before the season begins).

The above embodiments related to targeted advertising include databases of advertisements. Depending on the type of targeted advertising, the database selects an appropriate advertisement. In one embodiment, when multiple targeted advertising schemes are used simultaneously, an advertisement is chosen based on factors. One factor is whether any advertisements match criteria for targeting an advertisement. Another factor is the amount of advertising space available. Other factors can include price priority, rotational advertising (e.g., round robin), and hierarchical priority. In the price priority factor, if more than one advertisement matches the criteria, the advertisement that costs the most is displayed. In the rotational factor, all available matching advertisements are displayed in a round robin fashion. That is, each access time the advertisement changes or rotates in order. In the hierarchical factor, weights are given to each criterion. Weights can be assigned to age, income, amount of wager, history of wagers, favorite team/athlete/actor/actress/stocks/etc., endorsers of these favorites, polls, topics, etc. Different schemes can be designed to maximize "clicks" or accessing the advertisements (e.g., the advertisements contain links to other websites). History can be maintained and trends can be kept. Based on the history and trends, a weighting scheme can be developed to maximize advertising efficiency.

In one embodiment, a global username and reputation is used by the personal wagering facility or website to assist users to determine whether to wager/communicate with other users. In this embodiment, a signature or device registration number is attached with a username or reputation. That is, a global username, global reputation or both is/are employed. In one embodiment, a registration number of a computer or a computer's operating system is determined from an application. The registration number is uploaded by the application and associated with a user's username entered by a user. In one embodiment the user is unaware of the association. Many techniques can be used to associate the username with the registration number. For example, a database can be used to store the registration number and associate the username. In another embodiment, the registration number is embedded or tagged to the username. In these embodiments, if a user changes their username for any reasons, the registration number will remain as long as the user uses the same computing device. This makes it more difficult for a user to hide their identity. In one embodiment, the global username is used on multiple community websites.

In another embodiment, a registration number is given to a user based on a finger print scan or other biometric. In this embodiment, a user has their fingerprint scanned through a fingerprint scanner. A registration number is given to the user based on the fingerprint scan. The registration number is then associated with a username, a reputation, or both. This makes it harder for a user to change identities on websites where a certain amount of trust is required for other users to communicate with, contract with or wager with.

In the embodiment where a reputation is associated with a registration number, it is similar to a social security number as negative feedback remains with a user for a certain amount of time. For example, if a user receives negative feedback that is verified, the negative feedback/reputation remains with the user for a predetermined time period, e.g., one year, two years, three years, etc. In one embodiment the negative feedback can only be removed by the user with the negative feedback correcting their actions. In one embodiment, the global reputation remains with the user for use in many different websites. For example, a user can have a reputation for buying/selling on EBay®. The same user may register a username on MySpace®. The same user may register a username on the wagering facility or website. In this embodiment, as the reputation is global, a user wanting to deal with a new user or a user they have never dealt with before can view the user's reputation on the other websites to determine if they want to deal with the user or not. As the reputation is associated with a registration number it is harder for a user to hide who they are. This keeps users honest in an environment where a certain amount of trust is required.

In one embodiment, "ghost" messages appear and disappear on a main webpage and/or a user's personal page. In this embodiment the messages appear from dim to full and then dim and disappear. The ghost messages include information on recent big winners, recent new polls, recent hot topics, group call outs, user call outs, competition results, event results, etc. In one embodiment, a user can select whether to receive ghost messages or not. In another embodiment, a user can selectively receive ghost messages based on ghost messages preferences. For example, a user can select to only receive ghost messages relating to certain topics, certain users, certain polls, etc. The ghost messages provide added communication, entertainments and may facilitate users to make new wagers or communicate with other users based on the messages or information.

In one embodiment a user can select to store a ghost message. In this embodiment a user can "click" on the ghost message to prevent the message from disappearing. The user then is given an option to save the message or not. The user can access the saved message from a webpage, such as their personal page or summary page. In another embodiment, the user can send the message to another user. In one embodiment, a user of the personal wagering facility or website can transfer information or send information or ghost messages to users on different websites. For example, a user on the personal wagering facility can send a ghost message to a user on another website (e.g., MySpace®). In one embodiment the user can generate their own ghost messages and send the ghost message to any user on the personal wagering facility or website or any other website. In this embodiment, the user can therefore contact other users they know or are associated with wherever the other user is logged on to. In one embodiment the ghost message is transmitted similar to a text message or instant message. When a user has a global username, a database can track where the user may be logged onto. The ghost message is then sent to the website where the user is logged on to the specific user. In another embodiment, a user's different user names associated with different websites is maintained in a database. When the user logs on to a particular website the database is updated to mark a user logged on to the specific website. When a user wants to send a ghost message to a user or group of users (i.e., the user selects a certain amount of users or a group that many users belong to), an application reads the database for the specified users and transmits the ghost message to the user on the specific website that they are logged into. This is more convenient for users to receive messages that having to have an instant messaging application constantly on their display screen. Also, information sent through ghost messages may assist users in making new wagers or becoming aware of certain information they otherwise would not. For example, if a user reads an article or a news blurb that they feel is important to other users, they may typically email the other user(s). The other users may not have their email application running or may not receive notification of the email until much later. These embodiments facilitate the transmission of information, news, etc. to users more quickly and wherever the user is logged on to. In another embodiment, the ghost message appears as a text message on a portable device.

In another embodiment, advertising is included in the ghost message. In one embodiment, the advertisement included in the ghost message is targeted to an advertisement. In this embodiment, for example, an advertisement is elected from a database based on the content of the ghost message. In this embodiment, if the ghost message is associated with an athlete, event, user, etc., the advertisement is selected based on associated advertisements with the athlete, event, user's preferences, etc.

In one embodiment, the ghost message is stored in a queue when the targeted person is not logged into an associated account until the targeted person logs on. In one embodiment, the ghost message is only stored in the queue for a user selected amount of time as the ghost message may only be relevant for a short while.

Figure 7:
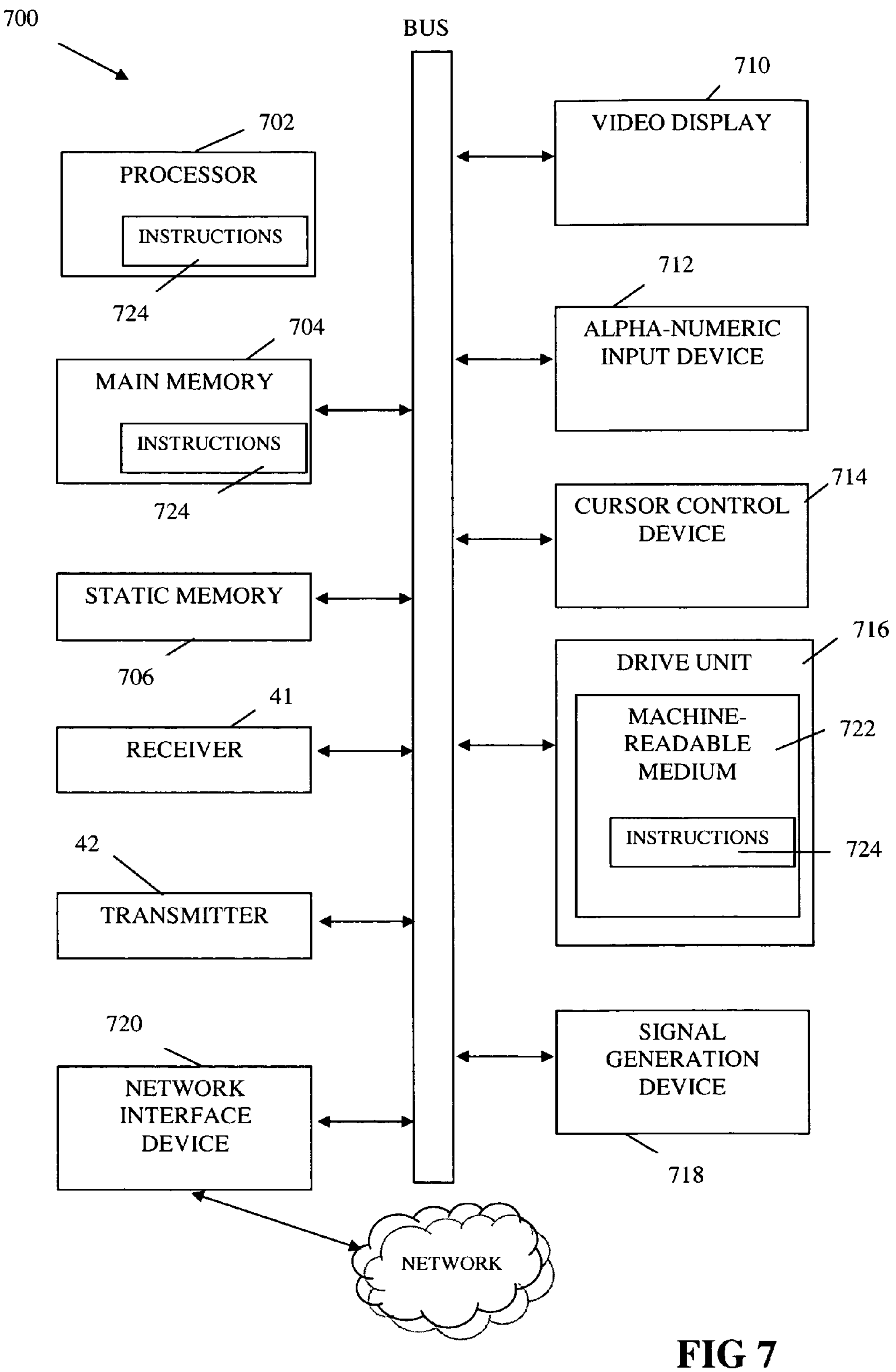
FIG. 7 illustrates a diagrammatic representation of machine in the exemplary form of a computer system.

FIG. 7 shows a diagrammatic representation of a machine in the exemplary form of a computer system 700 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a PC, a tablet PC, a set-top box (SIB), a PDA, a cellular (or mobile) telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 700 includes a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). The computer system 700 also includes an alphanumeric input device 712 (e.g., a keyboard), a cursor control device 714 (e.g., a mouse), a disk drive unit 716, a signal generation device 718 (e.g., a speaker) and a network interface device 720.

The disk drive unit 716 includes a machine-readable medium 722 on which is stored one or more sets of instructions (e.g., software 724) embodying any one or more of the methodologies or functions described herein. The software 724 may also reside, completely or at least partially, within the main memory 704 and/or within the processor 702 during execution thereof by the computer system 700, the main memory 704 and the processor 702 also constituting machine-readable media.

The software 724 may further be transmitted or received over a network 726 via the network interface device 720. In one embodiment, receiver 41 and transmitter 42 (see FIG. 1) are coupled to bus 708.

While the machine-readable medium 726 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present invention. The machine-readable medium includes any mechanism that provides (i.e., stores and/or transmits) information in a form readable by a machine (e.g., a computer, PDA, cellular telephone, etc.). For example, a machine-readable medium includes read-only memory (ROM); random-access memory (RAM); magnetic disk storage media; optical storage media; flash memory devices; biological electrical, mechanical systems; electrical, optical, acoustical or other form of propagated signals (e.g., carrier waves, infrared signals, digital signals, etc.). The device or machine-readable medium may include a micro-electromechanical system (MEMS), nanotechnology devices, organic, holographic, solid-state memory device and/or a rotating magnetic or optical disk. The device or machine-readable medium may be distributed when partitions of instructions have been separated into different machines, such as across an interconnection of computers or as different virtual machines.

By using the website that is run on a server in a location that provides legalized gambling (if the personal wagering system or website acts as an escrow service, etc.), users avoid the problem of gambling illegally by personally betting against another user. Friends that have moved apart can still get together and make personal bets for events. In these embodiments a legal way is provided for office event pools to be formed in states where gambling is not legal. The ease of setting up an office pool takes the burden out of collecting wager funds, disbursing the funds to the winner(s), etc. And, once a pool has the maximum number of participants (e.g., 100), new pools can be started. Portable devices may be used to check on wagers, check wager statistics, make wager offers, accept wager offers, and select event preferences and wager price ranges. This makes it convenient for users that want to wager but do not have access to a computer.

In some embodiments, owners of a website are not involved in wagering, do not receive any portion of a wager, and do not collect any service fees from users. In these embodiments, it is up to the users to make wagering decisions on their own. In these embodiments, the users choose their own odds, handicaps, amount of wager or what the wager is for. It is up to the users to complete a wager. The embodiments provide for a community of personal wagerers and a vehicle for personal wagering. Groups of users or other groups can combine in any way possible based on preferences. Users and groups maintain personal pages with their preferred wager related content.

Thus, a method and system provide network based personal wagering and community have been described. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. Accordingly, the specification and drawings are to be regarded in an illustrative rather than a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances "an embodiment," "one embodiment," or "some embodiments" are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

What is claimed is:

1. A system comprising:

a plurality of servers coupled to a wide-area network having a plurality of wager content stored in at least one memory device;

a plurality of users that communicate with the wide-area network over a communications medium, the plurality of users having pre-selected event preferences; the plurality of users each having a hyperlink browser to send HTTP requests to the plurality of servers and to render wager content returned in response to the HTTP requests; wherein the plurality of servers automatically alert said plurality of users of selected wager content in response to the HTTP requests, wherein said plurality of users are automatically alerted based on:

a first user of the plurality of users selecting a wager on an event for a first outcome between a first opponent and a second opponent, wherein at least the first outcome and a second outcome are possible outcomes for the event and wherein the first outcome and the second outcome are different outcomes;

a second user of the plurality of users having previously selected second opponent preferences, wherein said plurality of servers determines that the second opponent is in the event with the first opponent selected by the first user; and the plurality of servers automatically alerting the second user to accept the wager for the second outcome, based on the first user selecting the wager for the first outcome, wherein the alerting is further based on the second user's preselected event type preferences, wherein the plurality of servers are configured for maintaining individual user wagering trends and for controlling individual user wagering by limiting individual user wager amounts based on the individual user wagering trends, and at least one user wagers against at least one other user in a personal wager.

2. The system of claim 1, wherein the second user further selects a price range for wager offers, and the second user is alerted to wager offers when the wager offers are within the selected price range and when the second user's event type preferences are opposite of at least one event type preference selected by the first user, and wherein each user selects wagering amount limits and lost wager limits for the prevention of excessive gambling.

3. The system of claim 2, wherein a wager can be accepted after an event has begun.

4. The system of claim 3, wherein the wager is for goods, services, property, or a personal service, and only the at least one user and the at least one other user are responsible for completing the wager.

5. The system of claim 1, wherein the plurality of users automatically receive alerts containing targeted new wager offers, wherein the targeted wager offers are selected from a database based on one of a user's preferred athlete(s), team(s), event(s) or celebrity, polls, and what is wagered.

6. The system of claim 1, wherein the hyperlink browser runs on one of a cellular telephone, a personal digital assistant (PDA), a personal computer (PC), a palm computer, and a notebook computer.

7. The system of claim 1, wherein payments and non-payments of wagers effect user reputations in a community of users.

8. The system of claim 7, wherein a biometric is associated with each user reputation to prevent identity change within the community of users.

9. A method comprising:

employing a processor for:

a first user using a website to make a wager offer for a first outcome for an event, wherein the event is between a first opponent and a second opponent, wherein at least the first outcome and a second outcome are possible outcomes for the event, wherein the first outcome and the second outcome are different outcomes and wherein the first user determines one or more of: odds and points to include in the wager offer;

a second user having previously selected second opponent preferences, wherein a server determines that the second opponent is in the event with the first opponent selected by the first user;

automatically alerting the second user to accept the wager offer for the second outcome, based on the first user making the wager offer for the first outcome, wherein the alerting is further based on the second user's preselected event type preferences, and wherein the alerting includes one or more of: an email and a text message;

receiving a wager offer acceptance from the second user after being alerted to the wager offer made by the first user;

determining a winner between the first user and the second user based on an outcome of the event; and alerting the first user and the second user of the winner.

10. The method of claim 9, further comprising:

displaying wager statistics for the first user and the second user on a display, wherein the wager statistics are displayed in a hyperlink browser that runs on one of a cellular telephone, a personal digital assistant (PDA), a personal computer (PC), a palm computer, and a notebook computer.

11. The method of claim 9, further comprising:

maintaining top trends for offered wagers, and adding an event to an event listing based on user poll results, wherein the user poll queries users whether users would offer or accept wagers on a particular event if the particular event was available as a wager event in the event listing, wherein the user wagering trends are used to determine user wager habits to limit user wagering from exceeding a typical wagering amount.

12. The method of claim 9, wherein the second user preselects a price range and event preferences for wager offers, and the second user receives an alert for the wager offer when the wager offer is within the pre-selected price range and for the second opponent that comprises a user preselected team, athlete or individual that opposes the first opponent selected by the first user, and the first user and the second user each selects wagering amount limits and lost wagers limits for prevention of excessive wagering.

13. The method of claim 9, wherein a losing user of a wager directly transfers one of goods, services, a certificate for either goods or services, real property, photos, artwork, and fictional property to a winning user of the wager.

14. The method of claim 9, wherein one of the first user and the second user determine customized one or more of: odds and handicap to give to the other user, and payments and non-payments of wagers effect user reputations in a user community on the website.

15. The method of claim 9, wherein a user transfers a wager amount to an agent and the agent makes a wager for the user.

16. The method of claim 9, wherein receiving the wager acceptance from the second user closes the wager from the first user.

17. The method of claim 9, wherein alerting the second user to accept the wager offer is made by displaying an alert on a personal user webpage, and alerting the first user and the second user of the winner is made by one of text and video.

18. The method of claim 9, wherein the first user and the second user automatically receive alerts containing targeted new wager offers and targeted advertising, wherein the targeted advertising is selected from a database based on one of endorsers/sponsors of user preferred: athlete(s), team(s), event(s) or celebrity, wager value, user polls, and what is wagered.

19. A non-transitory machine-accessible medium containing instructions that, when executed, cause a machine to:

employ a processor to execute the steps of:

a first user using a website to select a wager offer for a first outcome for an event, wherein the event is between a first opponent and a second opponent, wherein at least the first outcome and a second outcome are possible outcomes for the event, and wherein the first outcome and the second outcome are different outcomes;

a second user of the plurality of users having previously selected second opponent preferences, wherein a server determines that the second opponent is in the event with the first opponent selected by the first user;

automatically alerting the second user to accept the wager offer for the second outcome, based on the first user's selection of the wager offer for the first outcome, via one or more of: email and text messaging, and wherein the alerting is further based on the second user's preselected event type preferences;

the first user automatically receiving notification of an acceptance of the wager offer by the second user;

determining a winner between the first user and the second user based on an outcome of the event and alert the winner of the outcome of the wager offer;

wherein the second user further selects a price range and event preferences for wager offer alerts, and the second user automatically receives an alert for the wager offer made by the first user when the wager offer is within the selected price range and when the event preferences are opposite of at least one event preference selected by first user, and wherein the first user and the second user each select wagering amount limits and lost wagers limits to control total wagering amounts for preventing excessive individual gambling.

20. The machine-accessible medium of claim 19, wherein a losing user of a wager directly transfers one of goods, services, a certificate for either goods or services, currency, fictional items, photos, artwork, and credits to a winning user of the wager, and payments and non-payments of wagers effect user reputations in a community of users on the website.

21. The machine-accessible medium of claim 19, wherein the first user and the second user automatically receive alerts containing targeted new wager offers and targeted advertising, wherein the targeted advertising is selected from a database based on endorsers or sponsors of one or more of: user preferred: athlete(s), team(s), event(s) or celebrity, wager value, user polls, and what is wagered.

* * * * *